(12) United States Patent
Yamada et al.

(10) Patent No.: US 12,734,923 B2
(45) Date of Patent: Sep. 15, 2026

(54) CHARGE MANAGEMENT DEVICE

(71) Applicant: TOYOTA JIDOSHA KABUSHIKI KAISHA, Toyota (JP)

(72) Inventors: Kenichi Yamada, Nisshin (JP); Toshiki Kashiwakura, Tokyo (JP); Akane Umezu, Nagoya (JP); Kayo Tsumoto, Nisshin (JP); Yuta Shishime, Tokyo (JP); Satoshi Komamine, Nagoya (JP); Kenji Ishiyama, Kasugai (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 375 days.

(21) Appl. No.: 18/502,743

(22) Filed: Nov. 6, 2023

(65) Prior Publication Data

US 2024/0239224 A1 Jul. 18, 2024

(30) Foreign Application Priority Data

Jan. 18, 2023 (JP) ................................ 2023-006070

(51) Int. Cl.

| | |
|---|---|
| ***B60L 53/62*** | (2019.01) |
| ***B60L 53/57*** | (2019.01) |
| ***B60L 58/12*** | (2019.01) |
| ***G06Q 50/06*** | (2024.01) |

(52) U.S. Cl.

CPC ............... *B60L 53/62* (2019.02); *B60L 53/57* (2019.02); *B60L 58/12* (2019.02); *G06Q 50/06* (2013.01); *B60L 2250/00* (2013.01)

(58) Field of Classification Search

CPC .......... B60L 53/62; B60L 53/57; B60L 58/12; B60L 2250/00; B60L 53/66; B60L 53/68; B60L 53/00; B60L 53/60; G06Q 50/06; H02J 7/40; H02J 7/42

See application file for complete search history.

(56) References Cited

U.S. PATENT DOCUMENTS

| | | | | |
|---|---|---|---|---|
| 11,518,264 | B2 * | 12/2022 | Lee | B60L 53/62 |
| 12,151,582 | B2 * | 11/2024 | Goei | B60L 53/63 |
| 2009/0084517 | A1 * | 4/2009 | Thomas | B22D 11/22 164/413 |
| 2011/0101915 | A1 * | 5/2011 | Mitsutani | B60L 53/305 320/109 |
| 2018/0294660 | A1 * | 10/2018 | Byun | B60L 3/0069 |
| 2022/0258632 | A1 * | 8/2022 | Ehrenhalt | B60L 53/68 |

FOREIGN PATENT DOCUMENTS

| | | |
|---|---|---|
| JP | 2021-121885 A | 8/2021 |

* cited by examiner

*Primary Examiner* — Ziaul Karim

(74) *Attorney, Agent, or Firm* — SoraIP, Inc.

(57) ABSTRACT

A charge management device includes a communication unit that communicates with a terminal device of an operator who delivers a charger for charging a vehicle of a user to a location desired by the user and collects the charger, and a control unit that transmits a collection instruction that instructs collection of the charger to the terminal device via the communication unit based on charging information that indicates a state of charge to the vehicle from the charger.

4 Claims, 5 Drawing Sheets

CHARGE MANAGEMENT DEVICE

CROSS-REFERENCE TO RELATED APPLICATION

This application claims priority to Japanese Patent Application No. 2023-006070 filed on Jan. 18, 2023, incorporated herein by reference in its entirety.

BACKGROUND

1. Technical Field

The present disclosure relates to a charge management device.

2. Description of Related Art

Japanese Unexamined Patent Application Publication No. 2021-121885 (JP 2021-121885 A) discloses a charging reservation system in which a user decides whether to implement a charging service by a third party and reserves the implementation of the charging service when determination is made that a charge amount of a battery is equal to or less than a predetermined value while a vehicle is stopped.

SUMMARY

When a charger disconnected from the vehicle is left in the place, there is a risk of the charger being stolen.

An object of the present disclosure is to reduce the risk of the charger being stolen.

A charge management device according to the present disclosure includes a communication unit that communicates with a terminal device of an operator who delivers a charger for charging a vehicle of a user to a location desired by the user and collects the charger, and a control unit that transmits a collection instruction that instructs collection of the charger to the terminal device via the communication unit based on charging information that indicates a state of charge to the vehicle from the charger.

According to the present disclosure, the risk of the charger being stolen is reduced.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 3 is a flowchart showing the operation of the charge management device according to the embodiment of the present disclosure;

DETAILED DESCRIPTION OF EMBODIMENTS

Hereinafter, an embodiment of the present disclosure will be described with reference to the drawings.

In each drawing, the same or corresponding portions are denoted by the same reference signs. In the description of the present embodiment, description of the same or corresponding components will be appropriately omitted or simplified.

Figure 1:
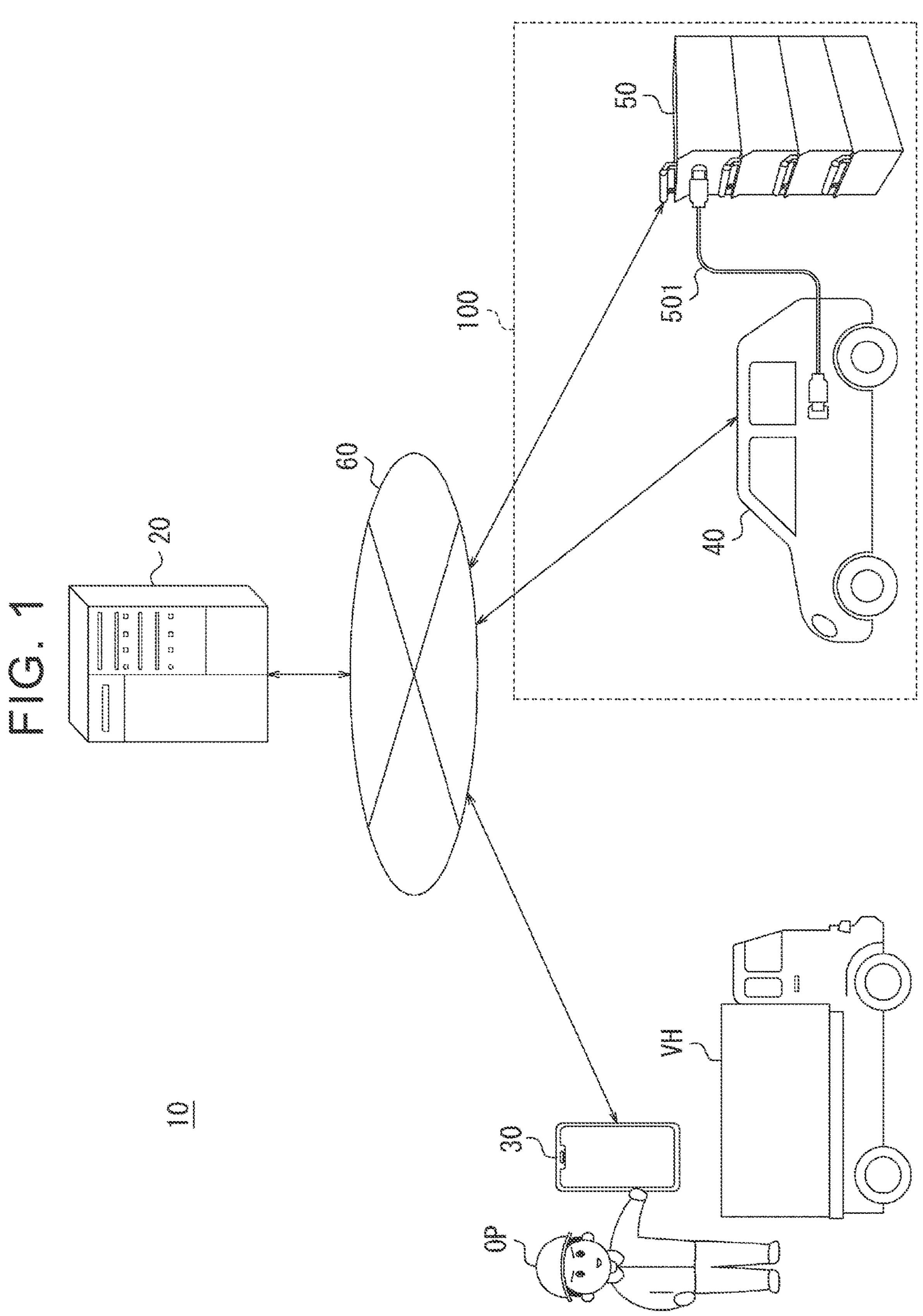
FIG. 1 is a diagram showing the configuration of a system according to an embodiment of the present disclosure.

The configuration of a system 10 according to the present embodiment will be described with reference to FIG. 1.

A system 10 according to this embodiment includes a charge management device 20, a terminal device 30, a vehicle 40, and a charger 50. The system 10 is used to provide a so-called rush charging service. The rush charging service is a service in which an operator OP transports the charger 50 using a charger transport vehicle VH or the like, and delivers and collects the charger 50 to an arbitrary location 100 desired by the user. In this embodiment, the operator OP tours the service area of the rush charging service in the charger transport vehicle VH to deliver and collect the charger 50.

Charge management device 20 can communicate with terminal device 30 and vehicle 40 via network 60 such as the Internet. Charge management device 20 may be able to communicate with charger 50 via network 60.

The charge management device 20 is installed in a facility such as a data center and operated by an administrator who manages the system 10. In this embodiment, an administrator who manages the system 10 is, for example, a business operator who provides a rush charging service. The charge management device 20 is, for example, a computer such as a server belonging to a cloud computing system or other computing system. The charge management device 20 may be installed in a management room of the system 10 and used by a manager. Alternatively, charge management device 20 installed in a management room may be shared by two or more managers. In this embodiment, the charge management device 20 causes the operator OP to deliver the charger 50 for charging the user's vehicle 40 to the user's desired location 100 using the charger transport vehicle VH, and performs control to collect the charger 50 according to the collection instruction RC.

The terminal device 30 is held by the operator OP. The terminal device 30 is, for example, a mobile device such as a mobile phone, a smartphone, or a tablet, or a PC. PC is an abbreviation for personal computer. The operator OP collects the charger 50 according to the collection instruction RC transmitted from the charge management device 20 to the terminal device 30.

Vehicle 40 is any type of motor vehicle that uses electric power for at least a portion of its propulsion, such as a HEV, PHEV, BEV, or FCEV. "HEV" is an abbreviation for hybrid electric vehicle. "PHEV" is an abbreviation for plug-in hybrid electric vehicle. "BEV" is an abbreviation for battery electric vehicle. "FCEV" is an abbreviation for fuel cell electric vehicle. Although the vehicle 40 is an automobile in this embodiment, it may be a vehicle dedicated to MaaS. Vehicle 40 may also be an AV with any level of automated driving. AV stands for autonomous vehicle. The level of autonomous driving is, for example, one of levels 1 to 5 in the SAE leveling, for example. SAE is an abbreviation for Society of Automotive Engineers. The number of vehicles 40 included in system 10 may be arbitrarily determined. In this embodiment, vehicle 40 is located at location 100. The location 100 is a space where the vehicle 40 can be parked for the time required for charging, such as the user's home. Location 100 includes a garage on the user's home lot. The user may restrict third party access to the location 100 by, for example, closing the gate of the home, or the gate of the garage.

Network 60 includes the Internet, at least one WAN, at least one MAN, or combinations thereof. WAN is an abbreviation for wide area network. MAN is an abbreviation for metropolitan area network. Network 60 may include at least one wireless network, at least one optical network, or a combination thereof. The wireless network is, for example, an ad hoc network, a cellular network, a wireless LAN, a satellite communication network, or a terrestrial microwave network. The term "LAN" is an abbreviation for "local area network".

The outline of the present embodiment will be described with reference to FIG. 1.

In this embodiment, a rush charge service is provided in which a charger 50 for a vehicle 40 is delivered to a desired location 100 such as a user's home or a parking lot in response to a user's request, and then collected.

In the system 10, the charger 50 is carried by the operator OP by the charger transport vehicle VH and delivered to the user's desired location 100. Location 100 is, for example, the user's home. Then, the user connects the delivered charger 50 and his/her own vehicle 40 via the cable 501 to charge the battery. The connection of the charger 50 to the vehicle 40 and the charging setting may be performed by the operator OP.

The charger 50 is connected to the vehicle 40 and placed anywhere within the site of the user's home during charging. For example, charger 50 may be placed in a garage or the like on the premises of the user's home. However, for example, a user who wants to use the vehicle 40 may leave the charger 50 unattended from the vehicle 40 during or after charging. Further, for example, the case where the charger 50 is left in a parking lot for a third party, or the case where the user moves the charger 50 out of the home premises for collection vehicles can be considered. If the charger 50 left unattended or moved in this way is left on the spot, it can be easily stolen by a third party.

In this embodiment, the charge management device 20 communicates with the terminal device 30 of the operator OP. The charge management device 20 transmits a collection instruction RC instructing collection of the charger 50 to the terminal device 30 based on the charging information D1 indicating the charging state of the vehicle 40 from the charger 50. The operator OP collects the charger 50 according to the collection instruction RC transmitted to the terminal device 30.

According to the present embodiment, the collection instruction RC for the charger 50 is transmitted according to the charging state of the vehicle 40 from the charger 50. For example, the user may detach the charger 50 from the vehicle 40 and leave it alone after charging is completed. Therefore, charging rate R of vehicle 40 is determined as the state of charge, and collection is instructed when charging rate R is equal to or higher than a predetermined value, whereby charger 50 that has completed charging is quickly collected. Therefore, the risk of charger 50 being stolen is reduced. Alternatively, as a state of charge, the presence or absence of connection between the charger 50 and the vehicle 40 is determined, and if it is determined that there is no connection, the charger 50 is preferentially collected, thereby establishing a connection with the vehicle 40. The charger 50 with the disconnected battery can be preferentially collected without waiting for the completion of charging. As a result, for example, even if a user who wants to use the vehicle 40 removes the charger 50 from the vehicle 40 during charging and leaves the charger 50 unattended, the charger 50 is preferentially collected without waiting for the completion of charging. Therefore, the risk of charger 50 being stolen is further reduced.

Figure 2:
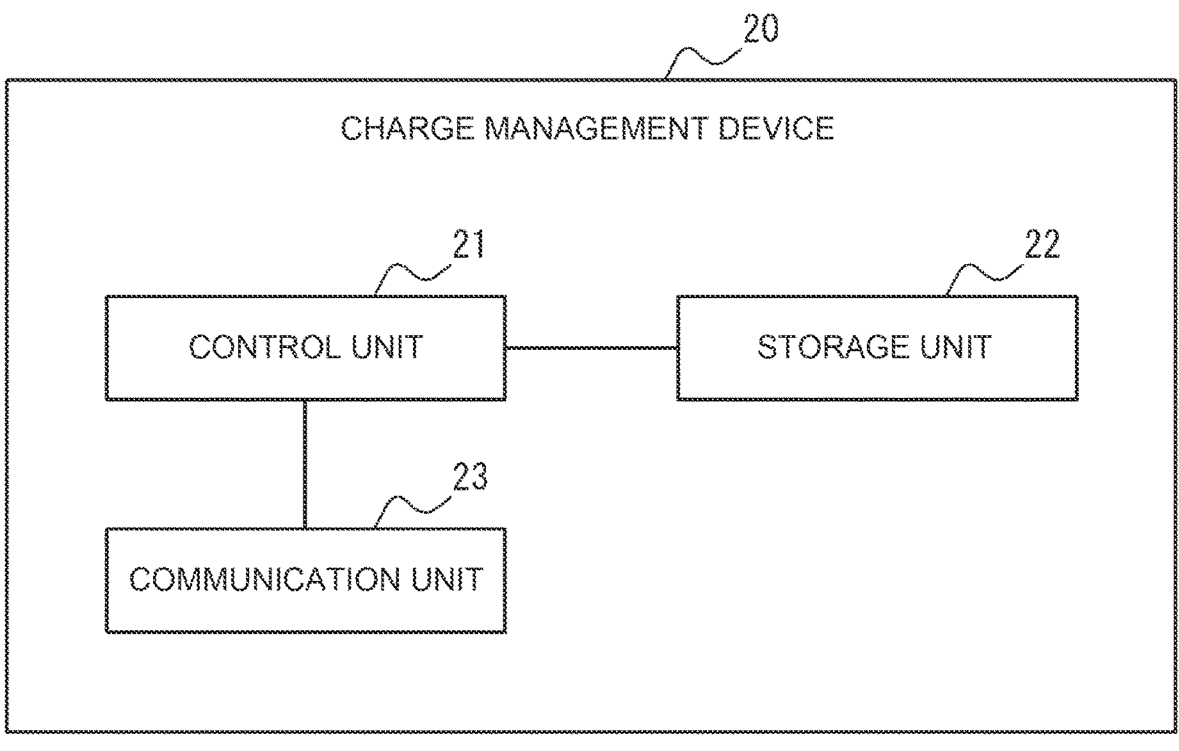
FIG. 2 is a block diagram showing the configuration of the charge management device according to the embodiment of the present disclosure.

The configuration of the charge management device 20 according to the present embodiment will be described with reference to FIG. 2.

Charge management device 20 includes control unit 21, storage unit 22, and communication unit 23.

The control unit 21 includes at least one processor, at least one programmable circuit, at least one dedicated circuit, or any combination thereof. The processor is a general-purpose processor such as a CPU or a GPU, or a dedicated processor specialized for a specific process. The term "CPU" is an abbreviation for "central processing unit". The term "GPU" is an abbreviation for "graphics processing unit". The programmable circuit is, for example, an FPGA. The term "FPGA" is an abbreviation for "field-programmable gate array". The dedicated circuit is, for example, an ASIC. The term "ASIC" is an abbreviation for "application specific integrated circuit". Control unit 21 executes processing related to the operation of charge management device 20 while controlling each unit of charge management device 20.

The storage unit 22 includes at least one semiconductor memory, at least one magnetic memory, at least one optical memory, or any combination thereof. The semiconductor memory is, for example, a RAM or a ROM. The term "RAM" is an abbreviation for "random access memory". The term "ROM" is an abbreviation for "read-only memory". The RAM is, for example, an SRAM or a DRAM. The term "SRAM" is an abbreviation for "static random access memory". The term "DRAM" is an abbreviation for "dynamic random access memory". The ROM is, for example, an EEPROM. The term "EEPROM" is an abbreviation for "electrically erasable programmable read-only memory". The storage unit 22 functions as, for example, a main storage device, an auxiliary storage device, or a cache memory. Storage unit 22 stores data used for the operation of charge management device 20 and data obtained by the operation of charge management device 20.

The communication unit 23 includes at least one communication interface. The communication interface is, for example, a LAN interface. Communication unit 23 receives data used for the operation of charge management device 20 and transmits data obtained by the operation of charge management device 20. In this embodiment, the communication unit 23 communicates with the terminal device 30 and the vehicle 40. The communication unit 23 may communicate with the charger 50.

The functions of the charge management device 20 are realized by executing the program according to the present embodiment by a processor as the control unit 21. That is, the functions of charge management device 20 are implemented by software. The program causes the computer to function as charge management device 20 by causing the computer to execute the operation of charge management device 20. That is, the computer functions as charge management device 20 by executing the operation of charge management device 20 according to a program.

The program can be stored in a non-transitory computer-readable medium. The non-transitory computer-readable medium is, for example, a flash memory, a magnetic recording device, an optical disc, an opto-magnetic recording medium, or a ROM. The distribution of the program is carried out, for example, by selling, transferring, or renting a portable medium such as an SD card, a DVD, or a CD-ROM in which the program is stored. The term "SD" is an abbreviation for "secure digital". The term "DVD" is an abbreviation for "digital versatile disc". The term "CD-ROM" is an abbreviation for "compact disc read-only memory". The program may be stored in the storage of the server and transferred from the server to other computers to distribute the program. The program may be provided as a program product.

The computer temporarily stores the program stored in the portable medium or the program transferred from the server in the main storage device, for example. The computer then causes the processor to read the program stored in the main storage device, and causes the processor to execute processes in accordance with the read program. The computer may read the program directly from the portable medium and execute processes in accordance with the program. The computer may execute the processes in accordance with the received program each time the program is transferred from the server to the computer. The processes may be executed by a so-called ASP service that realizes the function only by execution instruction and result acquisition without transferring the program from the server to the computer. The term "ASP" is an abbreviation for "application service provider". The program includes information that is used for processing by electronic computers and equivalent to a program. For example, data that is not a direct command to a computer but has the property of defining the processing of the computer corresponds to the "data equivalent to a program".

A part or all of the functions of charge management device 20 may be realized by a programmable circuit or a dedicated circuit as control unit 21. That is, part or all of the functions of charge management device 20 may be realized by hardware.

The operation of the charge management device 20 according to the present embodiment will be described with reference to FIGS. 3 to 5. This operation corresponds to the charge management method according to this embodiment.

Figure 3:
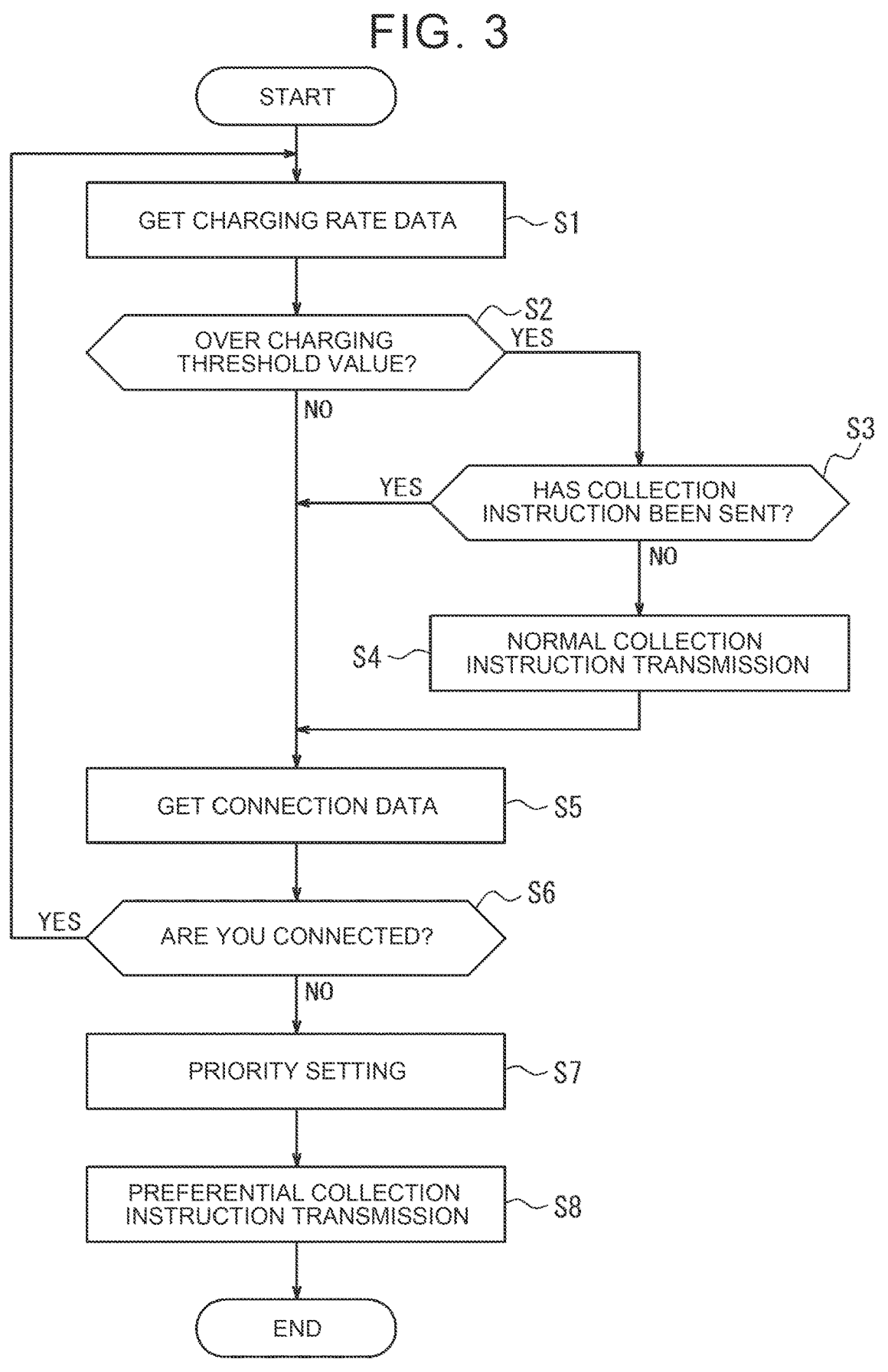

In S1 of FIG. 3, the control unit 21 of the charge management device 20 acquires the charging information D1 from the charger 50. The charging information D1 is information indicating the charging state of the vehicle 40. Specifically, the control unit 21 acquires the charging rate data d1 indicating the charging rate R of the vehicle 40 as the charging information D1. The charging rate data d1 may be obtained by any procedure, but is obtained by the following procedure, for example. The control unit 21 communicates with the vehicle 40 via the communication unit 23 and receives data indicating the amount of charge of the storage battery provided in the vehicle 40. The control unit 21 acquires the received data as the charging rate data d1.

In S2 of FIG. 3, the control unit 21 of the charge management device 20 determines whether the charging rate R indicated by the charging rate data d1 acquired as the charging information D1 in S1 is equal to or higher than the charging threshold value TH1. The charging threshold value TH1 can be any value, but it can be set to indicate that the charging of the vehicle 40 is about to be completed, for example, such that it takes less than X minutes to charge the vehicle 40 to 100%. It can be set arbitrarily within the range of values. In S2, when it is determined that the charging rate R is equal to or higher than the charging threshold value TH1, the process of S3 is performed. On the other hand, when it is determined in S2 that the charging rate R is less than the charging threshold value TH1, the process of S5 is performed.

In S3 of FIG. 3, control unit 21 of charge management device 20 determines whether collection instruction RC for instructing collection of charger 50 has already been transmitted. In S3, if the collection instruction RC has not been sent, the process of S4 is performed. In S3, if the collection instruction RC has already been transmitted, the process of S5 is performed.

In S4 of FIG. 3, the control unit 21 of the charge management device 20 transmits a collection instruction RC for instructing collection of the charger 50 to the terminal device 30 via the communication unit 23. Specifically, control unit 21 transmits a normal collection instruction RC1 for instructing normal collection of charger 50 as the collection instruction RC. In the present embodiment, normal collection refers to collecting the charger 50 when the operator OP patrolling by the charger transport vehicle VH comes near the location 100. For example, the control unit 21 creates a message M1 saying "Please collect the charger 50" as the normal collection instruction RC1, and transmits the created message M1 to the terminal device 30 via the communication unit 23. The terminal device 30 receives the message M1 from the charge management device 20 and outputs the received message M1 to an output unit such as a display. Alternatively, the terminal device 30 may output the content of the received message M1 by voice from a speaker corresponding to the output unit. The operator OP, who saw the message M1 output to the terminal device 30, makes rounds with the charger transport vehicle VH and collects the charger 50 at the location 100.

As described above, the charge management device 20 according to the present embodiment sends a collection instruction RC instructing collection of the charger 50 to the terminal device 30 based on the charging information D1 indicating the charging state of the vehicle 40 from the charger 50. Specifically, the control unit 21 of the charge management device 20 acquires the charging rate data d1 indicating the charging rate R of the vehicle 40 as the charging information D1. Then, the control unit 21 determines whether the charging rate R indicated by the obtained charging rate data d1 is equal to or higher than the charging threshold value TH1. When it is determined that the charging rate R is equal to or higher than the charging threshold value TH1, the control unit 21 transmits a normal collection instruction RC1 as the collection instruction RC.

According to such a configuration, the charger 50 that has completed charging is promptly collected. Therefore, the risk of charger 50 being stolen is reduced.

In the above-described embodiment, the control unit 21 of the charge management device 20 may further perform the processes from S5 to S8 shown in FIG. 3. Specifically, the control unit 21 may acquire connection data d2 indicating the connection state between the charger 50 and the vehicle 40 as the charging information D1. Then, the control unit 21 determines whether or not the charger 50 is connected to the vehicle 40 based on the acquired connection data d2, and when it is determined that the charger 50 is not connected to the vehicle 40, As the collection instruction RC, a preferential collection instruction RC2 that instructs preferential collection of charger 50 may be transmitted. In the present embodiment, preferential collection of the charger 50 means preferential collection of the charger 50 without waiting for the completion of charging of the vehicle 40. This is because, even if charging of vehicle 40 is not completed, when charger 50 is removed from vehicle 40, it is desirable to collect charger 50 preferentially from the viewpoint of theft prevention.

In S5 of FIG. 3, the control unit 21 of the charge management device 20 acquires the connection data d2 indicating the connection state between the charger 50 and the vehicle 40 as the charging information D1. The connection data d2 may be obtained by any procedure, but is obtained by the following procedure, for example. Control unit 21 communicates with charger 50 via communication unit 23 and receives data indicating the connection state of cable 501 provided in charger 50. Alternatively, the control unit 21 may acquire data indicating the locked state of the connector that connects the charger 50 to the charging port of the vehicle 40 as the connection data d2. The control unit 21 acquires the received data as the connection data d2.

In S6 of FIG. 3, the control unit 21 of the charge management device 20 determines whether the charger 50 is connected to the vehicle 40 based on the connection data d2 acquired as the charging information D1 in S5. As an example, assume that data indicating the connection state of cable 501 included in charger 50 is received as connection data d2 in S5. In this case, control unit 21 refers to connection data d2 and determines that charger 50 is not connected to vehicle 40 when cable 501 is shown to be disconnected. Alternatively, assume that data indicating the locked state of the connector for connecting the charger 50 to the charging port of vehicle 40 is received as connection data d2 in S5. In this case, the control unit 21 refers to the connection data d2 and determines that the charger 50 is not connected to the vehicle 40 when it indicates that the connector is unlocked. When it is determined in S6 that the charger 50 is not connected to the vehicle 40, the process of S7 is performed. On the other hand, when it is determined in S6 that the charger 50 is connected to the vehicle 40, the process returns to S1 and the process is performed again.

In S7 of FIG. 3, the control unit 21 of the charge management device 20 sets the collection priority PL of the charger 50. Specifically, the control unit 21 sets the priority PL1 as the priority PL. In the present embodiment, the priority PL is an index indicating the timing of collecting the charger 50. A higher priority PL means that the charger 50 needs to be collected at an earlier timing. In the present embodiment, the timing of collection of charger 50 with priority PL1 may be arbitrarily determined as long as it is earlier than the timing of collection by normal collection.

In S8 of FIG. 3, the control unit 21 of the charge management device 20 transmits a preferential collection instruction RC2 instructing preferential collection of the charger 50 to the terminal device 30 via the communication unit 23. Specifically, control unit 21 creates message M2 instructing preferential collection of charger 50 as preferential collection instruction RC2. The control unit 21 creates a message M2 including the priority PL1 set in S7. The control unit 21 transmits the created message M2 to the terminal device 30 via the communication unit 23. The terminal device 30 receives the message M2 from the charge management device 20 and outputs the received message M2 to an output unit such as a display. Alternatively, the terminal device 30 may output the contents of the received message M2 by voice from a speaker corresponding to the output unit. The operator OP who saw the message M2 output to the terminal device 30 preferentially collects the charger 50 according to the priority PL1 included in the message M2. Specifically, the operator OP directly goes to the location 100 and collects the charger 50 without going around the service area of the rush charging service.

As described above, the control unit 21 of the charge management device 20 acquires the connection data d2 indicating the connection state between the charger 50 and the vehicle 40 as the charging information D1, and charges based on the acquired connection data d2. It is determined whether or not the charger 50 is connected to the vehicle 40, and when it is determined that the charger is not connected, a preferential collection instruction RC2 for instructing preferential collection of the charger is transmitted as a collection instruction RC.

According to such a configuration, the charger 50 removed from the vehicle 40 is immediately collected regardless of whether charging is completed. Therefore, even if the user removes charger 50 from vehicle 40 before charging is completed and leaves charger 50 unattended, charger 50 is promptly collected without waiting for charging of vehicle 40 to be completed. Therefore, the risk of charger 50 being stolen can be further reduced.

In the above-described embodiment, the control unit 21 of the charge management device 20 further acquires the access data D2 when it is determined that the charger 50 is not connected, and determines whether or not the location 100 can be entered based on the acquired access data D2. If it is determined that entry to the location 100 is not possible, the priority PL may be lowered. The access data D2 is data indicating whether or not the location 100 can be entered. Specifically, after the priority PL1 is set in S7 of FIG. 3, the control unit 21 may further perform the processes of S9 to S12 shown in FIG. 4.

Figure 4:
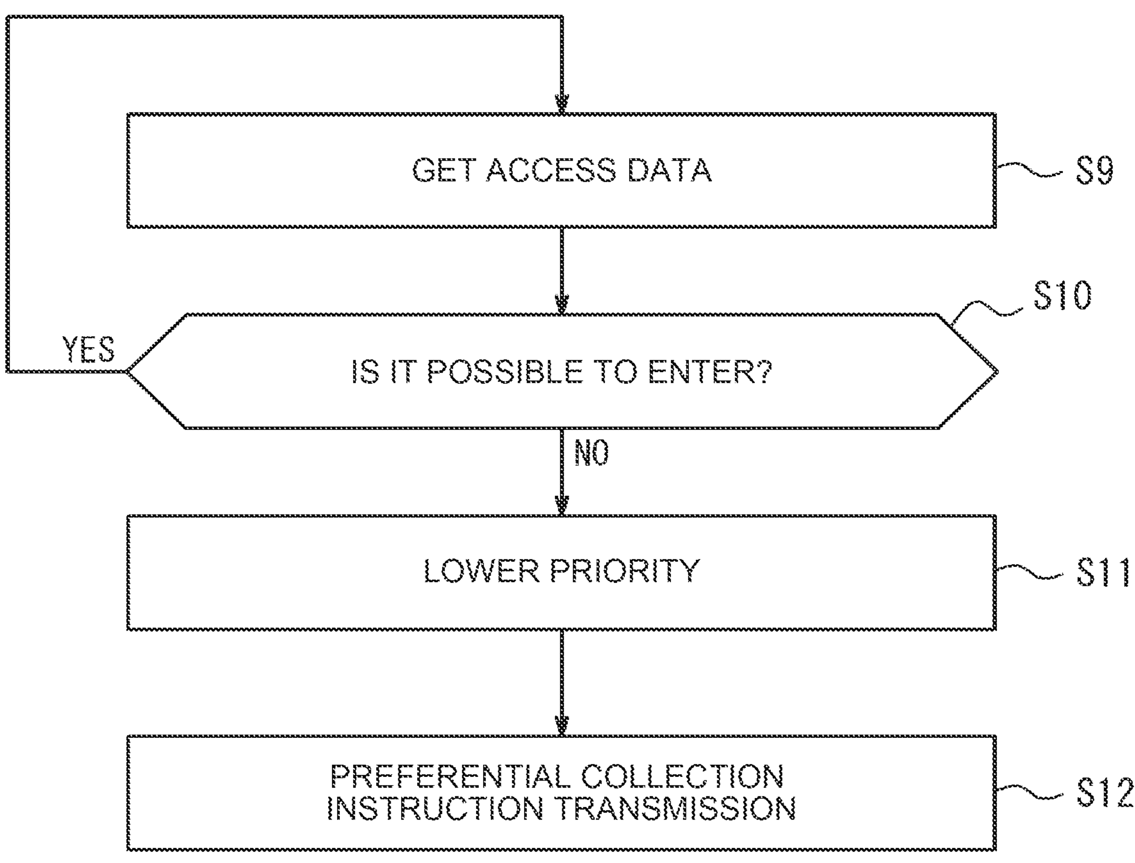
FIG. 4 is a flowchart showing another operation of the charge management device according to the embodiment of the present disclosure.

In S9 of FIG. 4, the control unit 21 of the charge management device 20 acquires the access data D2. The access data D2 may be obtained by any procedure, but is obtained by the following procedure, for example.

As an example, it is assumed that the location 100 is the user's home, and the vehicle 40 is being charged by the charger 50 in the garage on the premises of the user's home. In this case, the control unit 21 of the charge management device 20 communicates with, for example, an imaging sensor provided on the premises of the home via the communication unit 23, and receives an image captured by the imaging sensor via the communication unit 23. The control unit 21 acquires data representing the received image as the access data D2.

In S10 of FIG. 4, the control unit 21 of the charge management device 20 determines whether or not to enter the location 100 based on the access data D2 acquired in S9. Specifically, the control unit 21 analyzes the image indicated by the access data D2 acquired in S9 and determines whether the garage gate is closed. Alternatively, the control unit 21 may determine whether the gate of the user's home is closed. Instead of analyzing the image indicated by the acquired access data D2, the control unit 21 determines whether the gate of the house or the gate of the garage is locked based on the information from the lock sensor attached to the gate of the house or the garage. It may be detected whether or not Then, when it is determined that the gate of the house or the gate of the garage is locked, the control unit 21 may determine that the location 100 is not accessible. When it is determined in S10 that the location 100 cannot be entered, the process of S11 is performed. On the other hand, if it is determined in S10 that entry into the location 100 is permitted, the process returns to S9 and the process is performed again.

In S11 of FIG. 4, the control unit 21 of the charge management device 20 lowers the collection priority PL of the charger 50. Specifically, the control unit 21 sets, as the priority PL, a priority PL2 that is lower than the priority PL1 set in S7 of FIG. 3. This is because even if the charger 50 is not connected to the vehicle 40, if the location 100 cannot be entered, the risk of the charger 50 being stolen is considered small, so it is conceivable that the timing of collecting the charger 50 may be delayed. By lowering the priority PL when the location 100 cannot be entered, even if the charger 50 is not connected to the vehicle 40, for example, the charger 50 can be collected after waiting for the timing of the operator OP who patrols with the charger transport vehicle VH is near the location 100. By doing so, it is possible to reduce the risk of the charger 50 being stolen and improve the efficiency of the operator OP's collection of the charger 50. In the present embodiment, the collection timing of the charger 50 with the priority PL2 may be arbitrarily determined as long as it is later than the collection timing with the priority PL1. For example, the timing of collection of charger 50 with priority PL2 may be the same as the timing of normal collection. Alternatively, the timing of collection of charger 50 with priority PL2 may be earlier than the timing of normal collection and later than the timing of collection with priority PL1.

In S12 of FIG. 4, the control unit 21 of the charge management device 20 transmits a preferential collection instruction RC2 instructing preferential collection of the charger 50 to the terminal device 30 via the communication unit 23. Specifically, the control unit 21 creates a message M2' instructing preferential collection of the charger 50 as the preferential collection instruction RC2. The control unit 21 creates a message M2' including the priority PL2 set in S11, and transmits the created message M2' to the terminal device 30. Since other processes in S12 are the same as those in S8 of FIG. 3, description thereof is omitted. The operator OP who sees the message M2' sent to the terminal device 30 collects the charger 50 according to the priority PL2 included in the message M2'.

As described above, when it is determined that the charger 50 is not connected, the control unit 21 of the charge management device 20 further acquires the access data D2 indicating whether or not to enter the location 100, and based on the acquired access data D2, it is determined whether or not to enter the location 100. Then, when it is determined that entry into the location 100 is not possible, the control unit 21 lowers the priority PL for collecting the charger 50.

According to this configuration, when it is determined that the charger 50 is not connected to the vehicle 40, the access data D2 indicating whether or not to enter the location 100 is further acquired, and based on the acquired access data D2, the priority PL is set. That is, by determining whether or not to enter the location 100, and by lowering the priority PL when it is determined that entry is not allowed, the risk of theft of the charger 50 is reduced while the efficiency of collection of the charger 50 by the operator OP can be improved.

In the above-described embodiment, when it is determined that the charger 50 is not connected to the vehicle 40 in S6 of FIG. 3, the control unit 21 of the charge management device 20 may further acquire the position data D3 indicating the position P1 of the charger 50, and may further transmit the position data D3 to the terminal device 30 when the distance between the position P1 indicated by the acquired position data D3 and the location 100 is equal to or greater than the distance threshold value TH2. Specifically, when it is determined in S6 of FIG. 3 that the charger 50 is not connected, the control unit 21 may further perform the processing from S9' to S11' shown in FIG. 5. The processes from S9' to S11' shown in FIG. 5 may be performed instead of the processes from S9 to S11 in FIG. 4, or may be performed together with the processes from S9 to S11 in FIG. 4.

Figure 5:
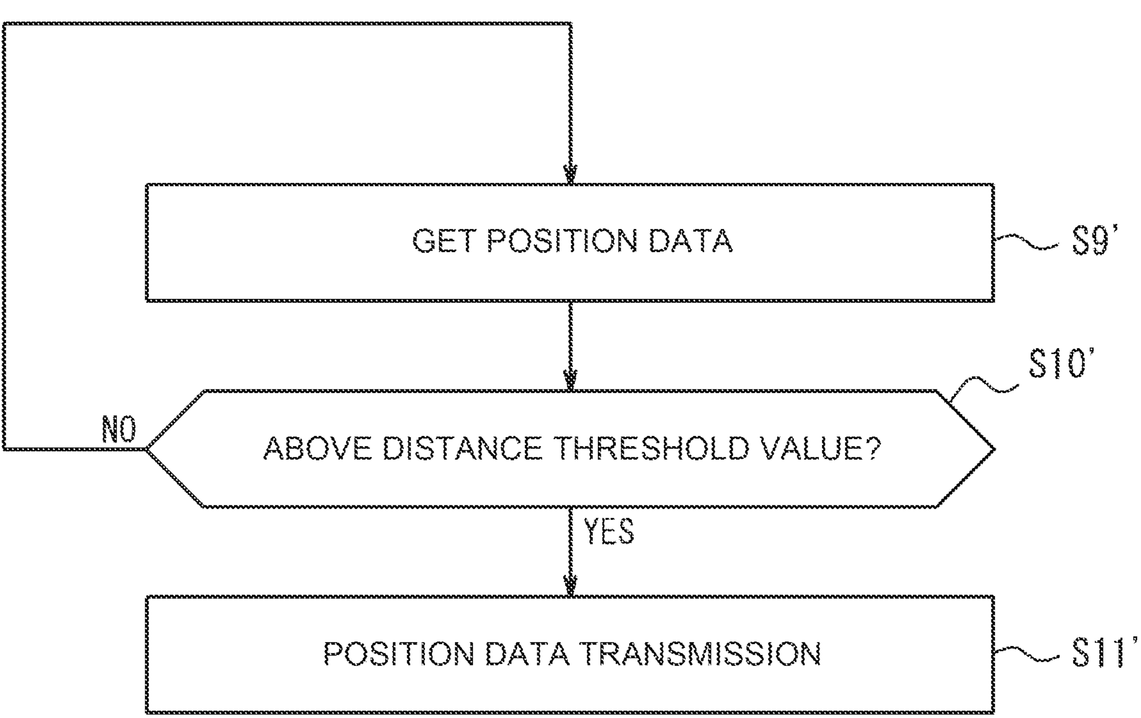
FIG. 5 is a flowchart showing another operation of the charge management device according to the embodiment of the present disclosure.

In S9' of FIG. 5, the control unit 21 of the charge management device 20 further acquires the position data D3 indicating the position P1 of the charger 50. The position data D3 may be obtained by any procedure, but is obtained by the following procedure, for example. Control unit 21 acquires data indicating position P1 measured by the positioning unit included in charger 50 as position data D3. The position P1 is indicated by two-dimensional coordinates or three-dimensional coordinates, for example. The positioning unit includes at least one GNSS receiver. The GNSS is, for example, GPS, QZSS, BDS, GLONASS, or Galileo. The satellites of the QZSS are referred to as quasi-zenith satellites. Charger 50 transmits data indicating position P1 measured by the positioning unit to charge management device 20. Control unit 21 receives data indicating position P1 transmitted from charger 50 via communication unit 23, and acquires the received data as position data D3.

In S10' of FIG. 5, the control unit 21 of the charge management device 20 determines whether the distance between the position P1 indicated by the position data D3 acquired in S9' and the location 100 is equal to or greater than the distance threshold value TH2. Although the distance threshold value TH2 can be any value, for example, if the location 100 is the user's home, the distance within the range of Y meters from the perimeter of the site to the outside can be set arbitrarily so that it can be seen that the charger 50 has left the site of the user's home. In S10', when it is determined that the distance is equal to or greater than the distance threshold value TH2, the process of S11' is performed. On the other hand, when it is determined in S10' that the distance is less than the distance threshold value TH2, the process returns to S9' and the process is performed again.

In S11' of FIG. 5, the control unit 21 of the charge management device 20 further transmits the position data D3 acquired in S9'. Specifically, control unit 21 transmits position data D3 indicating position P1 of charger 50 to terminal device 30 via communication unit 23.

As described above, when it is determined that the charger 50 is not connected, the control unit 21 of the charge management device 20 further acquires the position data D3 indicating the position P1 of the charger 50, The position data D3 is further transmitted when the distance between the position P1 indicated by the position data D3 and the location 100 is equal to or greater than the distance threshold value TH2.

According to this configuration, when it is determined that the charger 50 is not connected to the vehicle 40 and the distance between the position P1 of the charger 50 and the location 100 is equal to or greater than the distance threshold value TH2, the charger 50 is In addition to the collection instruction RC, position data D3 indicating the position P1 of the charger 50 is transmitted to the terminal device 30 of the operator OP. Therefore, for example, even if the charger 50 is removed from the vehicle 40 and transported from the location 100 by a third party, the operator OP can access the terminal device from the charge management device 20. By referring to the position data D3 transmitted to 30, the charger 50 can be searched for and collected. Therefore, the risk of charger 50 being stolen is further reduced.

The present disclosure is not limited to the embodiment described above. For example, two or more blocks shown in the block diagram may be integrated, or a single block may be divided. Instead of executing two or more steps shown in the flowchart in chronological order according to the description, the steps may be executed in parallel or in a different order, depending on the processing capacities of the devices that execute the steps, or as necessary. Other changes may be made without departing from the scope of the present disclosure.

What is claimed is:

1. A charge management device comprising:

a communication unit that communicates with a terminal device of an operator who delivers a charger to a location designated by a user, the charger being used to charge a vehicle of the user, and collects the charger; and a control unit configured to transmit a collection instruction to the terminal device, via the communication unit, the collection instruction instructing the operator to collect the charger based on charging information that indicates a state of charge to the vehicle from the charger;

acquire connection data indicating a connection state between the charger and the vehicle as the charging information, determine whether the charger is connected to the vehicle based on the acquired connection data, wherein the collection instruction that is transmitted is a preferential collection instruction when the control unit determines that the charger is not connected to the vehicle, the preferential collection instruction instructing the operator to collect the charger without waiting for completion of charging of the vehicle.

2. The charge management device according to claim 1, wherein the control unit acquires charging rate data that indicates a charging rate of the vehicle as the charging information, determines whether a charging rate indicated by the acquired charging rate data is equal to or higher than a charging threshold value, and transmits a normal collection instruction as the collection instruction when determination is made that the charging rate is equal to or higher than the charging threshold value.

3. The charge management device according to claim 1, wherein the control unit further acquires position data that indicates a position of the charger when determination is made that the charger is not connected to the vehicle, and further transmits the position data when a distance between a position indicated by the acquired position data and the location is equal to or greater than a distance threshold value.

4. The charge management device according to claim 1, wherein the control unit further acquires access data that indicates whether to enter the location when determination is made that the charger is not connected to the vehicle, determines whether to enter the location based on the acquired access data, and lowers priority of the collection of the charger when determination is made that entry is not possible.

* * * * *